Feb. 13, 1940.   C. WURR   2,190,506
APPARATUS FOR CREATING OR MEASURING FORCES
Filed Dec. 5, 1936   2 Sheets-Sheet 2

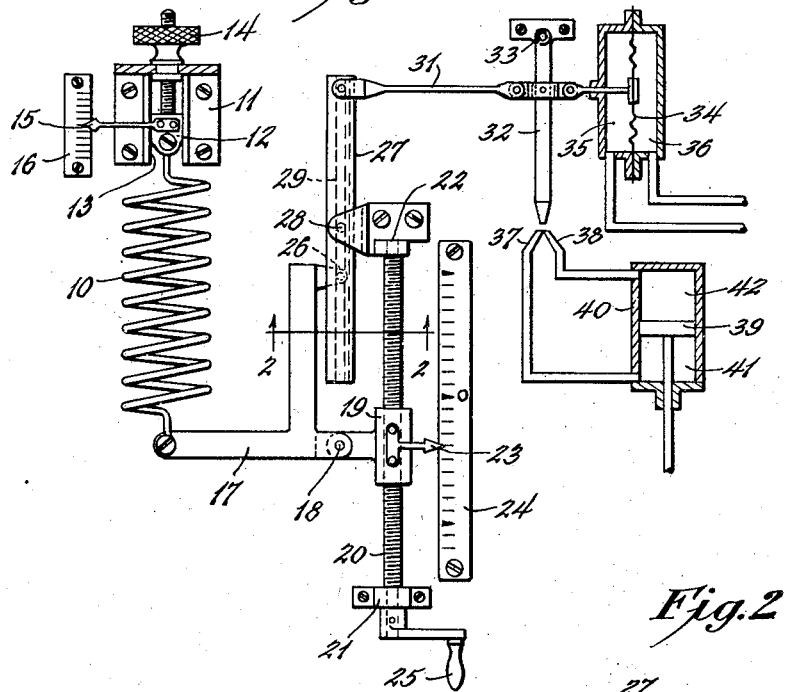
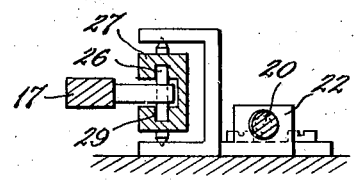
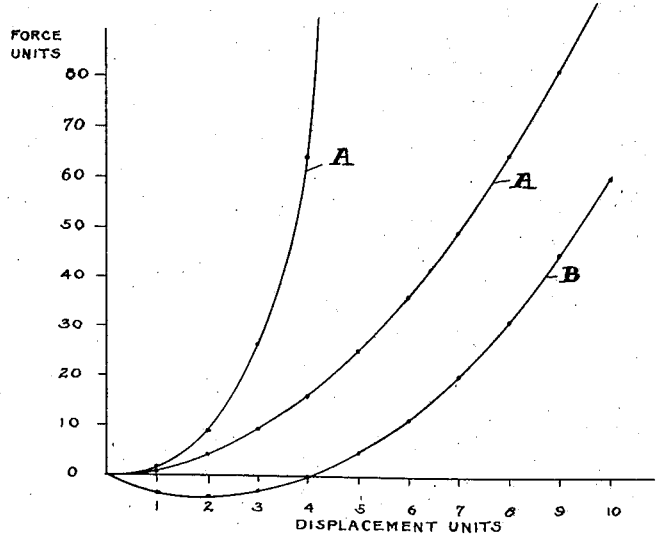

Inventor
Carl Wurr
By A. D. Adams
Attorney

UNITED STATES PATENT OFFICE 2,190,506

APPARATUS FOR CREATING OR MEASURING FORCES

Carl Wurr, Berlin-Lichterfelde, Germany, assignor to Askania-Werke A. G., a corporation of Germany Application December 5, 1936, Serial No. 114,485
In Germany December 6, 1935

7 Claims. (Cl. 74—522)

This invention relates to apparatus for creating or measuring forces the magnitude of which is an exponential function of a linear movement.

One object of this invention is to provide simple, dependable, and accurate means for creating forces which are variable according to an exponential function, more specifically the square or third power of a linear movement.

Another object is to provide in a balancing mechanism means for expressing the root-value of a force in terms of a linear movement.

Further objects and advantages will appear from a consideration of the description which follows with the accompanying drawings showing embodiments of the invention for illustrative purposes. It is to be understood that this detailed description is not to be taken in a limiting sense, the scope of the invention being defined by the appended claims.

Referring to the drawings:

Fig. 1 is a view of an apparatus for creating forces which are the square of a linear movement, the apparatus being shown in connection with a relay.

Fig. 2 is a sectional view of a detail of the apparatus of Fig. 1, the section being taken along line 2—2.

Fig. 3 is a chart showing forces exerted by the mechanism as plotted against a linear displacement.

Figure 4:
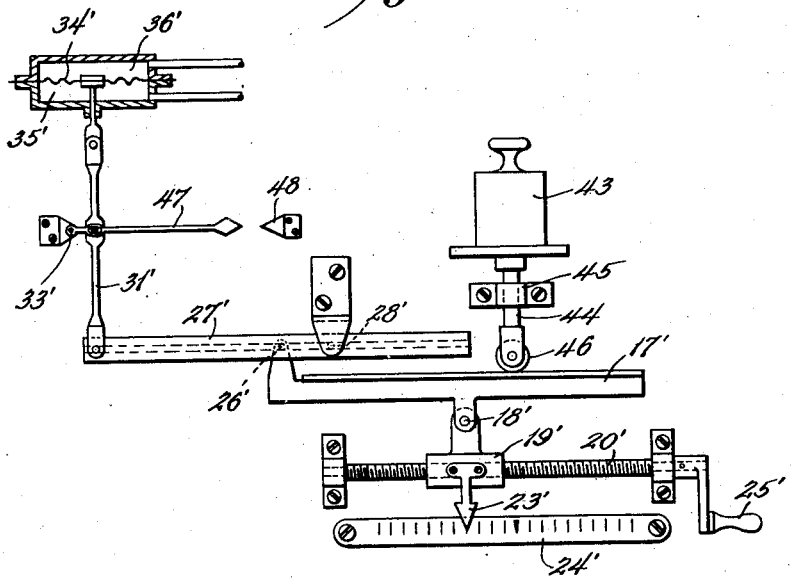
Fig. 4 shows a modified form of apparatus for creating and measuring forces which are a parabolic function of a linear displacement.

In Fig. 1 a force exerting member, shown as being a compression and expansion spring 10, is mounted in a fixed support 11. The tension of the spring is adjustable by means of a head 12 slidably mounted in a guiding recess 13 of the support and movable with respect thereto by means of a thumb-screw 14. The position of the head may be indicated by suitable means, such as a pointer 15 reading on a fixed scale 16. The other end of the spring is secured to a force transmitting crank-shaped lever 17. The lever 17 is pivotally supported at 18 by a linearly movable member shown as being a nut 19 traveling on a threaded shaft 20, rotatable in bearings 21 and 22. The movement of the nut may be indicated by a pointer 23 reading on a fixed scale 24. For rotating the shaft 20 there is shown a crank 25. The other arm of the crank-shaped lever engages at a point 26 a force exerting lever 27. The force exerting lever is pivoted at 28 in a fixed bearing and is suitably provided with a longitudinal recess 29 which the lever 17 engages by means of a pin 26. (Fig. 2.) For operative connection of the force exerting lever with a mechanism to which the force is to be applied there is shown a rod 31.

The operation of the device so far described is as follows.

Assuming the device be in its neutral position in which the pin 26 coincides with the axis 28 and the pointer 23 indicates zero, it is easily seen that no force is being exerted on the lever 27 and the rod 31. It may be further assumed that in this position the spring 10 have no initial tension. Upon displacing the nut 19 by turning the crank 25 the tension of the spring is increased proportionally to the displacement. Simultaneously the lever arm 26—28 is also increased proportionally to the displacement. The result is an increase of the force at the rod 31 which is the product of the spring-force and the lever-arm. The resulting force at the rod is therefore a parabolic function of the displacement of the nut, or, vice versa, the displacement proportional to the square root of a force at the rod.

The force, when plotted against the displacement, presents itself as a parabola A shown in the chart Fig. 3.

It may now be assumed that in the neutral position of the device, in which the pointer 23 reads zero, the spring 10 be given an initial compression tension by turning the thumbscrew 14. In the zero position the action of the spring on the lever 27 and rod 31 will be nil. Upon displacing the nut downwardly, as shown in Fig. 1, the compression force will gradually decrease, but the lever arm 26—28 increase, thereby tending to push the rod to the right. This action is illustrated by the parabolic curve B in Fig. 3 reaching below the zero line. Upon further displacement the force of the spring will decrease to zero and the action on the rod become nil again and increase after that point in the opposite direction, tending to pull the rod 31 to the left when the spring is expanding.

For illustration of a specific application of the device there is shown in Fig. 1 a pressure fluid relay of the well-known "Askania" jet-pipe type. A movable jet-pipe 32 pivoted at 33 and supplied with fluid under pressure from a suitable source (not shown) is connected to the rod 31. As a controlling impulse-system there is shown a diaphragh 34 acted upon by a differential pressure in chambers 35 and 36. Oppositely of the discharge nozzle of the jet-pipe there are shown receiving orifices 37 and 38 communicating with opposite sides of a servo motor piston 39 movable in a cylinder 40 and forming chambers 41 and 42 therewith.

The force which has to be exerted by the diaphragm to overcome the counteracting force of the rod is at all times a parabolic function of the displacement of the nut. Vice versa, with a variable force acting on the diaphragm the device will be in a state of equilibrium only when the displacement of the nut is a square-root value of the differential pressure applied at the diaphragm. The jet-pipe and the receiving nozzles may for illustration of this case be regarded as representing a zero-reading instrument, such as will be hereinafter described with a modified form of the invention.

Instead of using a spring for exerting a force which is proportional to the displacement there may be used a constant force, such as a weight acting on a variable lever. A modified form of the apparatus of Fig. 1 using a weight and lever is shown in Fig. 4. To corresponding parts primed reference numerals are applied.

In place of the spring 10 of Fig. 1 there is provided a weight 43 acting on the lever 17' by means of a stem 44, the latter being guided in a bearing 45 and suitably equipped with a roller 46 at the lower end. The force transmitting lever 17' engages the force exerting lever 27' in a way hereinbefore described. The lever 27' on the rod 31' in this instance is equipped with a zero-reading device shown as being a pointer 47 and fixed mark 48.

Upon displacement of the nut 19' to the left the action of the weight 43 is increased proportionally by the increase of the lever arm with which the roller 46 acts on the lever 17' and simultaneously increased by the lever arm 26'—28'. The action of the force exerting lever 27' is therefore again a parabolic function of a linear displacement.

Figure 5:
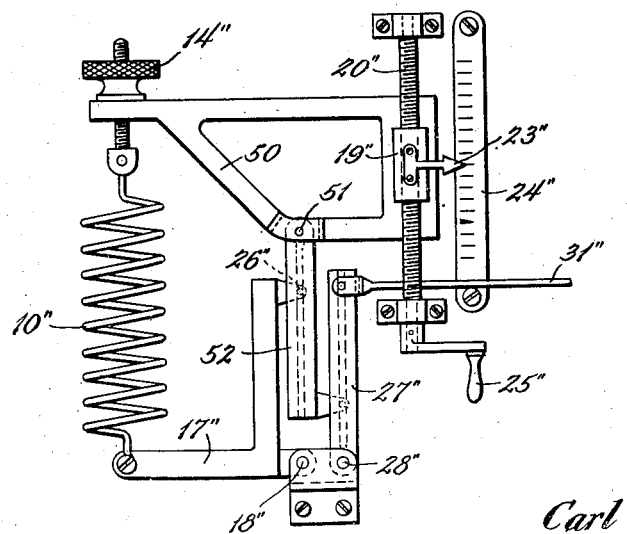
Fig. 5 shows an apparatus for creating and measuring forces which are a hyperbolic function of a displacement.

An apparatus for creating or varying forces according to the third power of a linear displacement is shown in Fig. 5. Parts corresponding to those in Fig. 1 are indicated by double-primed reference numerals.

A spring 10" is connected at one end with a crank-shaped force transmitting lever and with the other end to a movable support 50 integral with or secured to the nut 19". The support further carries a pivotal bearing 51 of a ratio lever 52 acted upon by the force transmitting lever 17". The ratio lever, in turn, acts on an actuating lever 27" pivoted at 28" and shown as provided with a rod 31.

The operation of the device shown in Fig. 5 is as follows:

Upon displacement of the support 50 the spring 10" is elongated or compressed and its force multiplied by the lever arm with which the force transmitting lever acts on the ratio lever and again by the arm with which the latter acts on the actuating lever. Since both lever arms and the spring tension are variable proportionally to the displacement of the support, or nut, the resulting force at the rod becomes a third-power or cubic function of the linear displacement. Vice versa, the linear displacement in a state of equilibrium is a cube-root value of a force applied at the actuating lever or rod. A force versus displacement curve C is shown in Fig. 3.

Obviously the present invention is not restricted to the particular embodiments thereof herein shown and described. Moreover it is not indispensable that all the features of this invention be used conjointly since they may be employed advantageously in various combinations and subcombinations.

What is claimed is:

1. In apparatus of the character disclosed an actuating lever having a guiding recess; a fixed pivotal support for said lever; a crank-shaped transmitting lever arranged to engage the recess of said actuating lever with one arm; a spring connected to the other arm of said transmitting lever; a fixed support for adjustably supporting said spring; a pivotal support for said transmitting lever; and a threaded spindle for linearly displacing said pivotal support relatively to said fixed pivotal support of the actuating lever and said fixed spring support, whereby the force exerted by said actuating lever is varied in response to the square of the displacement.

2. In apparatus of the character disclosed an actuating lever; a fixed pivotal support for said actuating lever; a crank-shaped transmitting lever; a spring connected to act on said transmitting lever; a fixed pivotal support for said transmitting lever; a ratio lever having a first engaging element for engaging said transmitting lever and a second engaging element for engaging said actuating lever; and a linearly movable member pivotally supporting said ratio lever and engaging said spring, so that upon displacement of said movable member the force of the spring as well as the distance between said first and said second element will be varied, whereby the force exerted by said actuating lever is variable proportional to the third power of the displacement.

3. In apparatus of the character disclosed an actuating lever; a force transmitting lever arranged to engage said actuating lever; a linearly displaceable pivot for said transmitting lever; and means for exerting a force on said transmitting lever; said force acting directly on said transmitting lever at a distance from its point engaging said actuating lever, whereby upon displacement of the pivot said distance will be varied so as to vary the lever arm of said force and simultaneously the lever arm of the forces exerted by said transmitting lever on said actuating lever, thereby varying the force directly acting upon said actuating lever according to the square of the displacement.

4. In apparatus of the character disclosed, an actuating lever, means for exerting a first force on said lever, a crank-shaped transmitting lever arranged to engage said actuating lever, a spring connected to act on said transmitting lever at a distance from the engaging point for exerting a counter force on said actuating lever to balance it against said first force, means for initially varying the tension of said spring, a pivotal support for said transmitting lever and means for linearly displacing said pivotal support relatively to said actuating lever, whereby the moment exerted by said transmitting lever on said actuating lever is varied in response to the square of the displacement.

5. A device for representing an exponential function of measuring values comprising in combination an actuating lever, first means for exerting a first force on said lever, a force transmitting lever arranged to engage said actuating lever, a pivot capable of linear displacement for said transmitting lever and second means acting upon said transmitting lever at a distance from its point engaging said actuating lever in order to exert a counter-force on said actuating lever by said transmitting lever in order to balance said actuating lever against said first force, so that upon establishment of an equilibrium between said first force and said counter-force said displacement represents said exponential function.

6. In apparatus of the character disclosed, an actuating lever, first means for exerting a first force on said lever, a crank-shaped transmitting lever arranged to engage said actuating lever, a spring connected to act on said transmitting lever at a distance from the engaging point, said spring exerting a second force on said transmitting lever so as to exert a counter-force upon the actuating lever by said transmitting lever in order to balance said actuating lever against said first force, a pivotal support for said transmitting lever and second means for linear displacement of said support relatively to said actuating lever, so that on establishment of an equilibrium between said first force and said counter-force said displacement represents a square root function of said first force.

7. In apparatus of the character disclosed, an actuating lever, first means for exerting a first force on said lever, a fixed pivotal support for said lever, a transmitting lever arranged to engage said actuating lever, second means for exerting a second force on said transmitting lever at a distance from said pivotal support and the engaging point of said actuating lever and said transmitting lever, in order to exert a counter-force on said actuating lever by said transmitting lever, a second pivotal support for said transmitting lever and second means for linear displacement of said second support relatively to said fixed support, so that upon establishment of equilibrium between said first force and said counter-force said displacement represents a square root function of said force.

CARL WURR.